(No Model.)
L. B. STONE.
TRIPOD FOR ROCK DRILLS.
No. 248,895. Patented Nov. 1, 1881.
Fig. 1.
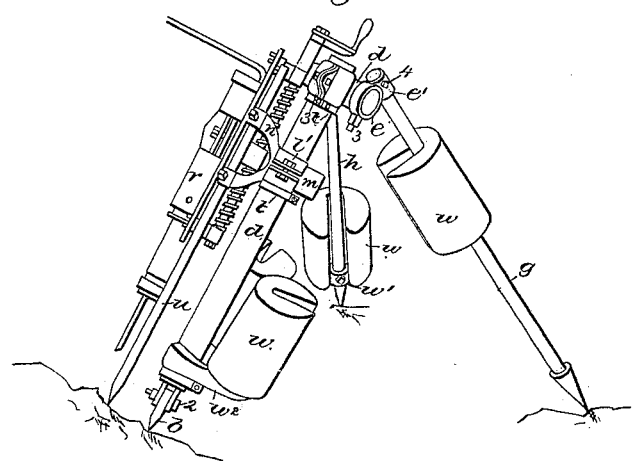
Fig. 2.
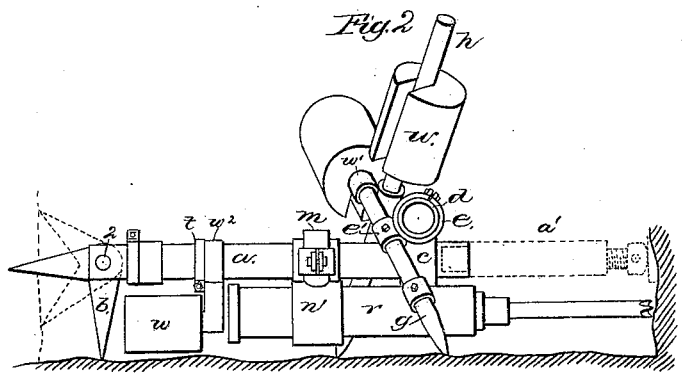
Fig. 4. Fig. 3. Fig. 5.
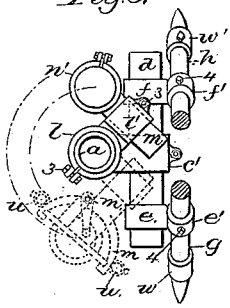
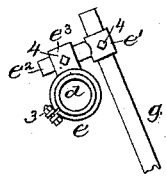
Witnesses.
Jos. P. Livermore
L. F. Connor
Inventor.
Lawson B. Stone
by Crosby & Gregory
Attys.

UNITED STATES PATENT OFFICE.

LAWSON B. STONE, OF MARBLEHEAD, MASSACHUSETTS.

TRIPOD FOR ROCK-DRILLS.

SPECIFICATION forming part of Letters Patent No. 248,895, dated November 1, 1881.

Application filed August 8, 1881. (No model.)

*To all whom it may concern:*

Be it known that I, LAWSON B. STONE, of Marblehead, Essex county, State of Massachusetts, have invented an Improvement in Tripods for Rock-Drills, of which the following description, in connection with the accompanying drawings, is a specification.

My invention relates to a tripod for rock-drills, and has for its object to facilitate the operation of setting up and adjusting the position of the drilling-machine, and to increase the range of positions in which the tripod itself, and consequently the machine supported thereon, can be mounted, and to enable the position of the machine to be varied relative to the tripod and material to be drilled, without disturbing the tripod itself, so that a number of holes may be drilled at proper distances apart by a single setting up of the tripod.

Drill-tripods have heretofore had the drilling-machine secured in some fixed relation upon them, so that the position of the machine can only be adjusted by changing the position of the feet of the tripod itself, and when the tripod is once set up the path of the drill is fixed, and only one hole can be drilled with the tripod in that position.

In my invention one of the legs of the tripod is adapted to sustain a clamp to which the drilling-machine or its feeding-carriage is fastened, the said clamp being adjustable upon the said tripod-leg, so that it can be fixed at any point throughout the length thereof, and can be revolved about the said leg to change the position of the machine relative thereto. The said leg thus forms an axis of revolution for the machine held in the clamp at a distance from the center of the said leg, so that if the machine be placed with its axis parallel to that of the leg the drill-point will, in the rotation of the clamp about the leg, describe a circle, at any point of which a hole may be made by fixing the clamp upon the leg by means of a set-screw or equivalent device. The sleeve or carriage holding the machine is preferably connected by a pivot to the clamp mounted upon the leg, so that the axis of the machine may be set at any desired angle to that of the leg, although it will usually operate best when parallel therewith, and the pivot is longitudinally movable in its clamp, to thereby vary the distance of the machine from the center of the said leg, and consequently the radius of the circle in which the machine revolves about the said leg, which is shown as cylindrical. The machine is thus capable of all of the adjustments on the said leg that it can have upon the well-known column used in subterranean passages in mining work, such a column necessitating, however, two opposite rigid surfaces or walls for its support, while in the tripod the machine-supporting leg can be mounted upon almost any rock-surface, it being supported upon the other two legs of the tripod, which are in the present embodiment of my invention connected therewith as follows: A connecting-clamp, consisting of two tubular sockets fixed with their axes at right angles, connects the machine-supporting or column leg with a transverse beam or cross-piece, preferably a cylinder of the same diameter as the said leg, and when fastened at its end forming therewith a T shape, upon the ends of which the other two tripod-legs are fastened by similar connecting-clamps, the sockets of which are preferably at an obtuse angle, so as to spread the said legs somewhat. Each socket portion of the different clamps is adjustable longitudinally and angularly upon the cylinder or leg held therein, and when properly adjusted they are fixed as by set-screws, and the tripod can be set up upon almost any surface, with the column-leg in any position from horizontal to vertical, thus giving an absolutely universal adjustment for the drill. The legs are held in place, as usual, by weights mounted thereon, and the column-leg is provided with a weight-holding saddle to support two or more weights of uniform size with those used upon the other or supporting legs, thus bringing the main portion of the mass of the tripod, or the resistance due to its inertia, in line with the action of the drill, and giving it great steadiness. Traveler-rings are provided upon the cylindrical portions of the tripod to sustain the clamps while being adjusted angularly, the said rings being first secured in proper position to determine the longitudinal movement of the said clamps, which are slid along to and then supported upon the said rings while being rotated to adjust the angular position of the part held thereby. The drill-carriage may be provided with an additional steadying-bar, passing down through guides therein and engaging the rock near the drill-point. The cross-piece of the tripod being of the same character with the column-leg, all the clamps will be interchangeable, and the machine or steadying weights may be mounted upon the said cross-piece when desired. The cross-piece and supporting-legs may be removed and a continuation of the column-leg, provided with the usual jack-screw, added thereto when it becomes convenient to employ a column instead of a tripod.

Figure 1 is a side elevation of a drill-tripod constructed in accordance with this invention, having a drill mounted upon a hand-fed carriage. Fig. 2 is a view of a similar tripod, mounted in a different position to enable the drill (shown in this instance as self-feeding) to work horizontally and close to the horizontal surface upon which the tripod stands, the dotted lines showing the column-leg employed as a portion of the usual column wedged between opposite walls; Fig. 3, a top view of the tripod, set with the column-leg vertical, and illustrating the variation in position of the drilling-machine that can be made without changing the position of the tripod; Fig. 4, a perspective view of the weight-supporting saddle detached; and Fig. 5, a modification, to be referred to.

The drill-supporting or column leg $a$, provided at one end with a suitable foot, $b$, shown as double-pointed or claw-shaped, and pivoted at 2, is made cylindrical and of uniform diameter throughout its length. A connecting-clamp composed of two tubular sockets, $c\ c'$, at right angles to one another and of proper size to fit upon the outside of the leg $a$, serves to connect the said leg with a cross-piece, $d$, preferably made of the same size therewith. The said cross-piece $d$ is provided with two other connecting-clamps, consisting of socket portions $e f$ of proper size to fit upon the said cross-piece, and connected socket portions $e' f'$, of proper size to receive the supporting-legs $g\ h$, and shown as fixed with their axes inclined to the axes of the sockets $e f$, so as to cause the legs $g\ h$ to diverge from the cross-piece $d$. The socket portions of the different connecting-clamps $c\ c'\ e\ e'\ f f'$ are thus all free to slide and rotate upon the portions held in them, and by a proper combination of these movements the column-leg $a$ may be placed in any desired position, it being shown as horizontal in Fig. 2, vertical in Fig. 3, and in an intermediate inclined position in Fig. 1. When fixed in the desired position the clamps are fastened by suitable bolts, 3, or set-screws, 4, the larger socket portion $c'\ c'\ e f$ being shown as split and drawn together by the bolts 3, thus fixing them securely upon the cylinder $a d$ without injury to the surface thereof, while the former sockets, $f f'$, may be fixed in place by set-screws. When the tripod is thus set in the desired position it is held to resist the vibration of the drill by weights $w$, which may be mounted in any usual manner upon the legs $g\ h$, being shown as slotted to embrace the said legs, and resting upon supporting-rings $w'$, fixed in any desired position upon the said legs by suitable set-screws. The column-leg $a$ is provided with a weight-supporting saddle, $w^2$, made to embrace the said leg, and shown as provided with two arms to receive weights $w$, similar to those mounted upon the supporting-legs $g\ h$. The drilling-machine may be attached to the column-leg $a$ of the tripod when thus set up in suitable position by any convenient form of clamp, such as commonly employed with a column.

As herein shown, the machine-holding clamp consists of a socket portion, $l$, fitted and adapted to be fastened to the leg $a$ or cross-piece $d$ similarly to the socket portions $c\ c'$ of their connecting-clamp, and of a pivot-socket, $l'$, at right angles thereto, and adapted to receive the pivot $m$ of the drill-carriage $n$ or holding-sleeve $n'$ of any usual hand-fed or self-feeding drill, $r$, Fig. 2 and the full lines, Fig. 3, illustrating a drill substantially such as shown in United States Patent to J. B. Johnson, No. 213,663, dated March 25, 1879. By placing the drill $r$ with its axis parallel with the leg $a$, as shown, and revolving it with the clamp $l\ l'$ about the said leg, the drill may be set to work at any point of the dotted circle, Fig. 3, the radius of which may be varied by a longitudinal movement of the pivot $m$, as indicated by dotted lines, so that any desired number of parallel holes may be drilled in the space included between the two dotted circles at one setting up of the tripod, and by changing the angle of the drill diverging holes may be drilled throughout a much larger area.

Stop-rings $t$ are fixed in any desired position to support the clamps $c$ and $l$, and prevent their longitudinal movement when loosened for the purpose of adjusting their angular position.

The carriage $n$ is provided with a steadying-bar, $u$, to engage the rock at the side of the drill-point, and, if desired, two can be used, one at either side of the carriage, as shown in dotted lines, Fig. 3.

As shown in the first three figures, the angle between the sockets $e\ c'$ and $f f'$, and consequently the angle between the cross-piece $d$ and legs $g\ h$, is fixed, and the actual spread of the feet of the said legs can be adjusted by sliding the legs through the sockets $e' f'$, (they being shown nearer together in Fig. 2 than in Fig. 1,) or by sliding the sockets $e f$ longitudinally on the cross-piece $d$.

If desired, the leg-connecting sockets can be constructed to permit of angular adjustment of the legs $g\ h$ relative to the cross-piece $d$, as shown in Fig. 5, in which the clamp is constructed on the same plan as the machine-holding clamp $l\ l'$, the socket $e'$ for the leg $g$ being provided with a pivot, $e^2$, entering a socket, $e^3$, connected with the one $e$ mounted on the cross-piece $d$, this arrangement giving a universal movement to the leg $g$, and the clamp $e$ may be mounted upon the leg *a*, the cross-piece *d* being omitted.

Telescopic legs of usual construction may be employed, if desired.

A jack-screw, *a'*, may be inserted in the end of the column-leg, as shown in dotted line, Fig. 2, when there are opposite walls to brace the column between, and the cross-piece *d* and legs *g h* will then be removed, the parts shown in full and dotted lines, Fig. 2, constituting the entire apparatus needed for all kinds of work.

I claim—

1. In a tripod for rock-drills, a column-leg and supporting-legs connected therewith by joints capable of angular variations to sustain it upon the rock, combined with a machine-holding clamp adjustable upon the said column-leg, whereby the position of the drill may be varied and adjusted independently of that of the tripod, substantially as and for the purpose set forth.

2. In a tripod for rock-drills, a column-leg and cross-piece, and connecting-clamp therefor, combined with supporting-legs and clamps to connect them with the said cross-piece, and a machine-holding clamp adapted to be fastened to any portion of the said column-leg, substantially as described.

3. The column-leg and cross-piece of uniform diameter therewith, and the connecting-clamp provided with two sockets fixed at right angles to receive the said leg and cross-piece, combined with the supporting-legs and clamps to connect them with the said cross-piece, the sockets of all the said clamps permitting free longitudinal and rotary movement of the parts held therein, and provided with fixing screws or bolts to hold them when properly adjusted, substantially as described.

4. The column-leg of uniform diameter and its supporting-legs connected therewith by clamps adapted to vary the angle between the said supporting-leg and column-leg, combined with a machine-holding clamp provided with a socket fitted to the said column-leg and a pivot-socket at right angles therewith, and the drill-holding carriage or sleeve pivoted in the said pivot-socket, whereby the machine may be revolved with the clamp bodily about the said leg and turned upon the pivot to vary the direction of its axis, substantially as described.

5. In a rock-drill tripod, the column-leg and supporting-legs therefor, combined with the weight-supporting saddle adapted to embrace the said column-leg, and provided with weight-receiving arms to sustain weights similar to those employed with the supporting-legs, substantially as described.

6. The column-leg and supporting-legs therefor, combined with the clamps adapted to slide and rotate upon the said column-leg, and the stop-rings to limit their sliding movement and support them while being adjusted angularly, substantially as described.

In testimony whereof I have signed my name to this specification in the presence of two subscribing witnesses.

LAWSON B. STONE.

Witnesses:
 JOS. P. LIVERMORE,
 L. F. CONNOR.